United States Patent [19]
Elkind et al.

[11] Patent Number: 5,282,034
[45] Date of Patent: Jan. 25, 1994

[54] BRIGHT VIDEO LINE SELECT DISPLAY

[75] Inventors: Bob Elkind, Gaston; Kenneth M. Ainsworth; Gilbert A. Hoffman, both of Aloha; Howard A. Landsman, Beaverton; Gary Sargeant, Portland; James L. Tallman, Beaverton, all of Oreg.

[73] Assignee: Tektronix, Inc., Wilsonville, Oreg.

[21] Appl. No.: 43,092

[22] Filed: Apr. 5, 1993

[51] Int. Cl.$^5$ ...................... H04N 17/00; H04N 17/02
[52] U.S. Cl. ........................................ 358/139; 358/10
[58] Field of Search ................................. 358/10, 139; H04N 17/80, 17/02

[56] References Cited

U.S. PATENT DOCUMENTS

| | | | |
|---|---|---|---|
| 3,798,366 | 3/1974 | Hunt et al. | 358/113 |
| 4,364,080 | 12/1982 | Vidovic | 358/139 |
| 4,897,716 | 1/1990 | Drewery et al. | 358/105 |

Primary Examiner—James J. Groody
Assistant Examiner—Glenton B. Burgess
Attorney, Agent, or Firm—Francis I. Gray

[57] ABSTRACT

A bright video line select display for a waveform monitor is achieved by storing a selected line from a video frame of a digital video input signal. The stored selected line is iteratively substituted for a plurality of video lines during the vertical interval of the digital video input signal. When line select mode is selected, those video lines during the vertical interval are displayed as a waveform, resulting in a brighter display of the selected video line.

3 Claims, 1 Drawing Sheet

BRIGHT VIDEO LINE SELECT DISPLAY

BACKGROUND OF THE INVENTION

The present invention relates to video waveform monitors, and more particularly to a bright video line select display for a video waveform monitor that enhances the visibility of a selected line of a video signal.

A common method of operation of a waveform monitor, such as the 1740A, 1750A and 1760 series of waveform monitors manufactured by Tektronix, Inc. of Wilsonville, Oreg., United States of America, is known as "line select" mode. In this mode only one or two video lines out of each video frame, i.e., out of 525 or 626 lines, is used for the display, resulting in a dim display on an economical cathode ray tube (CRT) display. The horizontal sweep rate is diminished by a factor of from 262 to 625, and the dimness is further worsened when the horizontal sweep time is divided in order to provide an expanded horizontal scale along the X-axis. The dimness of the display makes it difficult for an operator to observe the characteristics of the line selected for display, which difficulty is further compounded if the operator is observing the waveform monitor display from some distance. Thus the utility of this feature is limited by the display brightness.

What is desired is a method of providing a bright video line select display for a waveform monitor without corrupting the video signal that is displayed on a picture monitor.

SUMMARY OF THE INVENTION

Accordingly the present invention provides a bright video line select display for a video waveform monitor by storing a selected video line from a video frame in a line buffer. The selected video line from the line buffer is multiplexed with the video signal processed by the video waveform monitor so that during the vertical blanking interval of each video field of the video frame it is reiterated several times. The display system for the video waveform monitor selects for display the portion of the video signal during the video blanking interval when the line buffer is selected by the multiplexer for output as part of the video signal. The result is to increase the number of lines actually displayed per video frame by a factor determined by the number of video lines used to reiterate the selected line during the vertical blanking interval.

The objects, advantages and other novel features of the present invention are apparent from the following detailed description when read in conjunction with the appended claims and attached drawing.

DESCRIPTION OF THE PREFERRED EMBODIMENT

Figure 1:
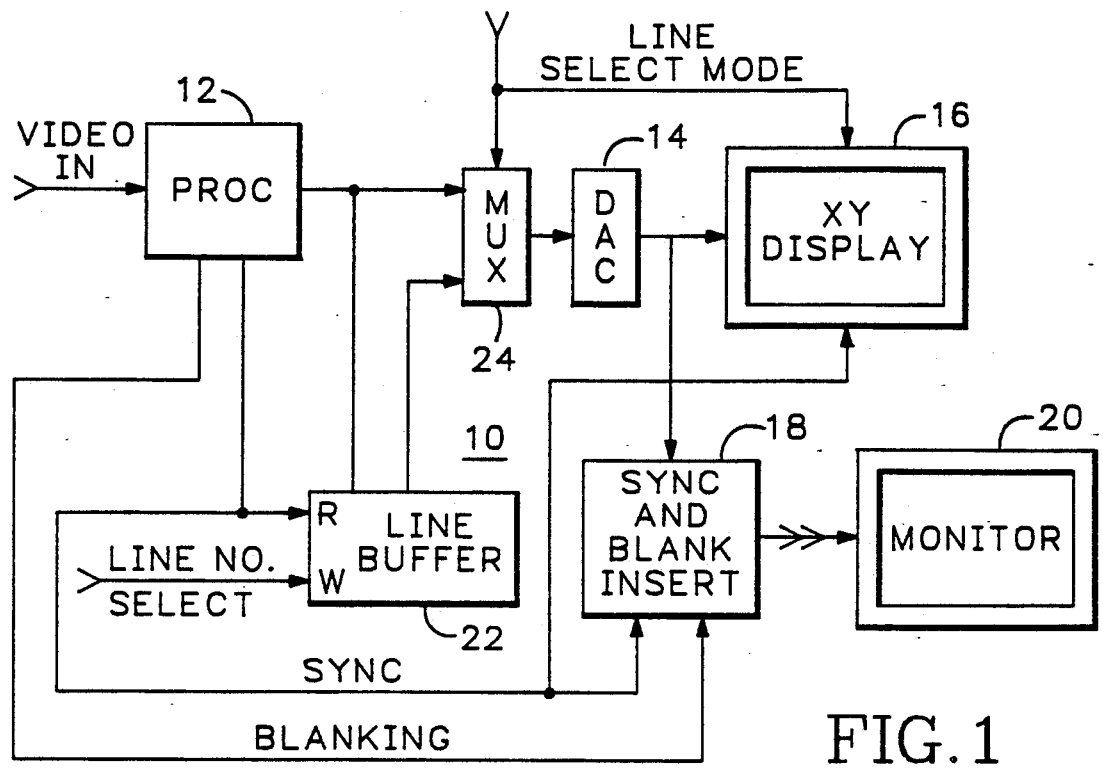
FIG. 1 is a block diagram of a waveform monitor for providing a bright video line select display according to the present invention.

Referring now to FIG. 1 a video waveform monitor 10 receives a video input signal that is digitized for processing or otherwise is in a digital format. A processor 12 manipulates the video input signal and produces a processed video signal. The processed video signal is input to a digital to analog converter (DAC) 14 to produce an analog video signal. The analog video signal is then input to a waveform display system 16 to provide a waveform display. The analog video signal also is input to a sync and blanking insertion circuit 18, to which also is input a sync and a blanking signal from the processor 12, to produce an encoded video signal for display as a video image on an external picture monitor 20. In the prior art line select mode a signal representing the selected line is input to the display system 16 to blank the display except during the selected line.

To produce a bright video line select display a line buffer 22, such as a random access memory (RAM), is added to the waveform monitor 10. The processed video signal from the processor 12 is input to the line buffer 22. The output of the line buffer 22 is applied to one input of a multiplexer 24. The processed video signal from the processor 12 is applied to another input of the multiplexer 24. The output of the multiplexer 24 is input to the DAC 14. A line number select command acts as a write command to write the specified video line into the line buffer 22. The selected line thus stored in the line buffer 22 may be constantly read out to the multiplexer 24 in response to the sync signal from the processor 12, corresponding to each line of the processed video signal. A line select mode command acts as a select command for the multiplexer 24 as well as a line select command for the display system 16. The line select mode command is active during specified lines of the video frame during the vertical blanking interval so that for those video lines the selected line from the line buffer 22 is iteratively passed through the multiplexer 24 in lieu of the corresponding lines of the processed video signal from the processor 12. The line select mode command also acts to pass only those video lines to the display system 16 for display. The line select mode command also may be used in lieu of the sync signal to enable reading from the line buffer 22 only during the specified lines in the vertical blanking inverval.

Figure 2:
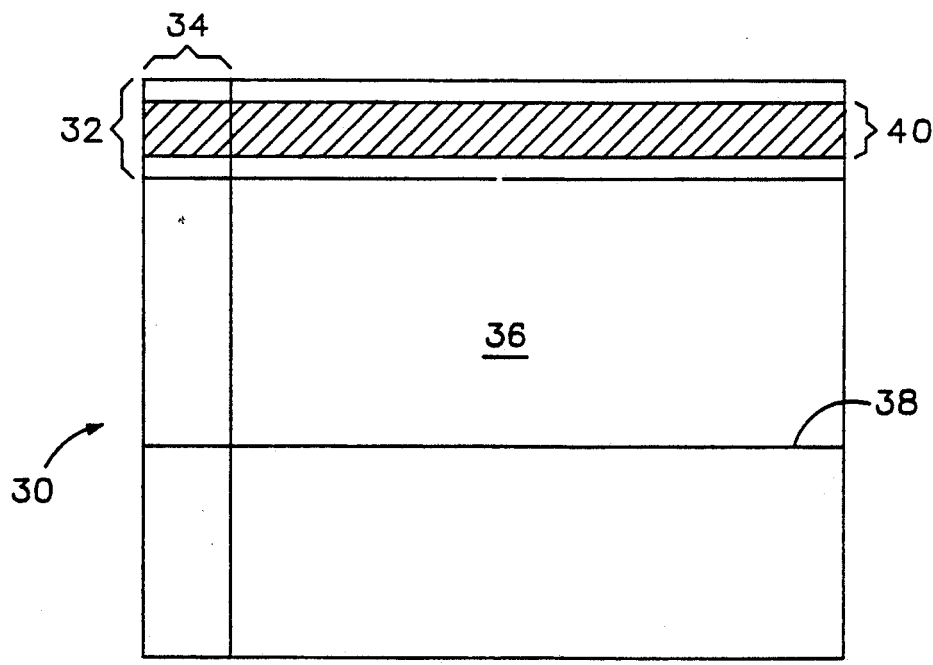
FIG. 2 is a graphic illustration of the method of providing the bright video line select display according to the present invention.

FIG. 2 illustrates a video frame 30 having a vertical blanking interval 32 and a horizontal blanking interval 34. As is well known in the art, these blanking intervals allow for vertical and horizontal retrace of the electron beam of the CRT so that the picture image is scanned line by line from top to bottom and left to right to produce the video image on the picture monitor 20. The remaining portion of the video frame 30 is the active picture area 36 that contains the video information to produce the picture image. As is also well known, the video frame may divided into two interlaced fields. To display a particular line of the video information, a line 38 from the video frame is selected. The video information on the selected video line is stored in the line buffer 22. During specified lines 40 of the vertical interval, when in line select mode, the line select mode command enables the display system 16 to display only those specified lines and selects the output from the line buffer 22 to be output from the multiplexer 24. The result is the same as repeating the selected line 38 on each line of the specified lines 40, as indicated by the shading. Since the number of times the same line is displayed is thus increased by a factor equal to the number of lines that make up the specified lines 40, the brightness of the line display produced by the display system 16 is increased. Also by inserting the selected line 38 into the processed video signal during the vertical interval 32, there is no impact upon the image displayed on the picture monitor 20 since the blanking for the encoded video signal is inserted by the sync and blanking insertion circuit 18 regardless of what is done in the vertical interval of the processed video signal.

Thus the present invention provides a bright video line select display for a waveform monitor by storing a selected video line and iteratively inserting it into the video signal for a plurality of lines of the vertical interval, these lines of the vertical interval being displayed when the line select mode is selected.

What is claimed is:

1. An apparatus for producing a bright video line select display for a waveform monitor, the waveform monitor being of the type having a processor for processing a digital video input signal to produce a processed video signal, a digital to analog converter for converting the processed video signal to an analog video signal, and a display system for displaying the analog video signal as a waveform, the display system including a line select mode, comprising:

means for storing a selected one of the video lines from the processed video signal; and means for selecting the selected one of the video lines from the storing means for iterative substitution into the processed video signal over a plurality of lines of the vertical interval of the processed video signal when in the line select mode so that the selected one of video lines is displayed iteratively as the waveform by the display system.

2. The apparatus as recited in claim 1 wherein the storing means comprises a random access memory that stores the selected one of the video lines in response to a line number select command and outputs the stored selected line iteratively otherwise.

3. The apparatus as recited in claim 2 wherein the selecting means comprises a multiplexer having the processed video signal from the processor as one input and the stored selected line iteratively from the random access memory as another input, the multiplexer providing as an output the processed video signal with the plurality of lines within the vertical interval of the processed video signal being replaced with the stored selected line when a line select mode command is active, the line select mode command also being used by the display system to display the plurality of lines containing the stored selected line as the waveform.

* * * * *